(12) United States Patent
Fu

(10) Patent No.: US 12,159,472 B2
(45) Date of Patent: Dec. 3, 2024

(54) BUILDING DATUM EXTRACTION FROM LASER SCANNING DATA

(71) Applicant: Autodesk, Inc., San Francisco, CA (US)

(72) Inventor: Yan Fu, Pudong New District (CN)

(73) Assignee: AUTODESK, INC., San Francisco, CA (US)

( * ) Notice: Subject to any disclaimer, the term of this patent is extended or adjusted under 35 U.S.C. 154(b) by 1022 days.

(21) Appl. No.: 15/788,630

(22) Filed: Oct. 19, 2017

(65) Prior Publication Data
US 2018/0075285 A1    Mar. 15, 2018

Related U.S. Application Data

(63) Continuation of application No. 14/465,569, filed on Aug. 21, 2014, now Pat. No. 9,811,714.

(60) Provisional application No. 61/871,042, filed on Aug. 28, 2013.

(51) Int. Cl.
G06V 20/64    (2022.01)
(52) U.S. Cl.
CPC .................................. *G06V 20/64* (2022.01)
(58) Field of Classification Search
None
See application file for complete search history.

(56) References Cited

U.S. PATENT DOCUMENTS

| 2006/0012597 A1* | 1/2006 | Chakraborty | G06K 9/00214 |
| | | | 345/419 |
| 2006/0061566 A1 | 3/2006 | Verma et al. | |
| 2006/0114252 A1* | 6/2006 | Ramani | G06F 17/50 |
| | | | 345/419 |
| 2009/0310867 A1 | 12/2009 | Matei et al. | |
| 2011/0304619 A1 | 12/2011 | Fu et al. | |

(Continued)

FOREIGN PATENT DOCUMENTS

| CN | 101887597 | 7/2012 |
| CN | 102708587 | 10/2012 |

OTHER PUBLICATIONS

Valero E, Adán A, Cerrada C. Automatic method for building indoor boundary models from dense point clouds collected by laser scanners. Sensors (Basel). 2012;12(12):16099-16115. Published Nov. 22, 2012. doi:10.3390/s121216099 (Year: 2012).*

(Continued)

*Primary Examiner* — Jiangeng Sun
(74) *Attorney, Agent, or Firm* — Gates & Cooper LLP

(57) ABSTRACT

A method, apparatus, system, and computer program product provide the ability to extract level information and reference grid information from point cloud data. Point cloud data is obtained and organized into a three-dimensional structure of voxels. Potential boundary points are filtered from the boundary cells. Level information is extracted from a Z-axis histogram of the voxels positioned along the Z-axis of the three-dimensional voxel structure and further refined. Reference grid information is extracted from an X-axis histogram of the voxels positioned along the X-axis of the three-dimensional voxel structure and a Y-axis histogram of the voxels positioned along the Y-axis of the three-dimensional voxel structure and further refined.

16 Claims, 10 Drawing Sheets

(56) References Cited

U.S. PATENT DOCUMENTS

2014/0301633 A1  10/2014  Furukawa et al.

OTHER PUBLICATIONS

J. Ding, Z. Chen, X. He and Y. Zhan, "Clustering by finding density peaks based on Chebyshev's inequality," 2016 35th Chinese Control Conference (CCC), 2016, pp. 7169-7172, doi: 10.1109/ChiCC.2016.7554490. (Year: 2016).*

B. G. Amidan, T. A. Ferryman and S. K. Cooley, "Data outlier detection using the Chebyshev theorem," 2005 IEEE Aerospace Conference, 2005, pp. 3814-3819, doi: 10.1109/AERO.2005.1559688.*

Adan, A. et al. "Automatic Creation of Semantically Rich 3D Building Models from Laser Scanner Data", Proceedings of the International Symposium on Automation and Robotics in Construction (ISARC), Jun. 2011.

Huber, D. et al. "Using Laser Scanners for Modeling and Analysis in Architecture, Engineering, and Construction", In Proceedings of the Conference on Information Sciences and Systems (CISS), Princeton, NJ, 2010.

Dorninger, P. et al. "A Comprehensive Automated 3D Approach for Building Extraction, Reconstruction and Regularization from Airborne Laser Scanning Point Clouds", Sensors, vol. 8, 7323-7343, 2008.

Palshikar, G. et al. "Simple Algorithms for Peak Detection in Time-Series", In Proceedings of 1st IIMA International Conference on Advanced Data Analysis, Business Analytics and Intelligence, Ahmedabad, India, Jun. 2009.

Li, W. et al. "Lightweight 3D Modeling of Urban Buildings from Range Data", In: 3DIMPVT IEEE, 124-131, 2011.

Nguyen, V. et al. "A Comparison Of Line Extraction Algorithms Using 2D Laser Rangefinder For Indoor Mobile Robotics", In Proc. of the IEEE/RSJ International Conference on Intelligent Robots and Systems, IROS, 1929-1934, 2005.

Okorn B. et al. "Toward Automated Modeling of Floor Plans", in. Proceedings of the Symposium on 3D Data. Processing, Visualization and Transmission, Paris, France, 2010.

Schnabel, R. et al. "Efficient RANSAC for Point-Cloud Shape Detection". Computer Graphics Forum, 26: 214-226, 2007.

Schindler, K. et al. "A Model-Based Method For Building Reconstruction". In Proc. of IEEE Workshop on Higher Level Knowledge in 3D Modeling and Motion Analysis, 74, 2003.

Schröter, D. et al. "RG Mapping: Learning Compact and Structured 2D Line Maps of Indoor Environments", in: Proceedings of the IEEE International Workshop on Robot and Human Interactive Communication, ROMAN'02, 2002.

* cited by examiner

BUILDING DATUM EXTRACTION FROM LASER SCANNING DATA

CROSS-REFERENCE TO RELATED APPLICATIONS

This application is a continuation under 35 U.S.C. § 120 of U.S. application Ser. No. 14/465,569, filed on Aug. 21, 2014, which issued Nov. 7, 2017 as U.S. Pat. No. 9,811,714 with inventor(s) Yan Fu, entitled "BUILDING DATUM EXTRACTION FROM LASER SCANNING DATA," which application is incorporated by reference herein, and which application claims the benefit under 35 U.S.C. Section 119(e) of the following commonly-assigned U.S. provisional patent application, which is incorporated by reference herein: Provisional Application Ser. No. 61/871,042, filed on Aug. 28, 2013, by Yan Fu, entitled "BUILDING DATUM EXTRACTION FROM LASER SCANNING DATA."

BACKGROUND OF THE INVENTION

1. Field of the Invention

The present invention relates generally to point cloud data, and in particular, to a method, apparatus, and article of manufacture for extracting the level and reference grid of floor plan information of a building from point cloud data.

2. Description of the Related Art (Note: This application references a number of different publications as indicated throughout the specification by references enclosed in brackets, e.g. [x]. Such references may indicate the first named author and year of publication e.g., [Okorn et al. 2010]. A list of these different publications ordered according to these references can be found below in the section entitled "References." Each of these publications is incorporated by reference herein.)

Building information models (BIM) are being increasingly used throughout a building's lifecycle in the architecture, engineering, and construction (AEC) industry. BIMs can be used for many purposes, from planning and visualization in the design phase, to inspection during the construction phase, and to energy efficiency analysis and security planning during the facility management phase. However, BIMs are often not available for most existing buildings. Further, the BIM created during the design phase may vary significantly from what was actually built. As a result, there is strong interest in creating BIMs of the actual as-built building.

Laser scanners are rapidly gaining acceptance as a tool for three-dimensional (3D) modeling and analysis in the architecture, engineering, and construction (AEC) domain. With technological development/evolution, laser scanners are capable of acquiring range measurements at rates of tens to hundreds of thousands of points per second, at distances of up to a few hundred meters, and with a measurement error on the scale of millimeters. These characteristics make them well suited for densely capturing the as-built information of building interiors and exteriors. Typically, laser scanners are placed in various locations throughout and around a building. The scans from each location are registered and aligned to form a point cloud in a common coordinate system. Multiple scans are often needed to capture the point cloud of a whole building.

Currently, as-built BIMs are mostly created interactively from the point cloud data generated by the laser scanners. However, this creation process is labor-intensive and error-prone. Thus, there is a lack of research work and commercial software tools currently available for automatically extracting building datum information from point clouds.

In most applications and software tools, floor plan modeling is achieved by first creating a horizontal slice of the environment [Li et al. 2011] and then using various two-dimensional (2D) geometric modeling methods [Nguyen et al. 2005], including RANSAC (RANdom SAmple Consensus), iterative end point fitting, and the Hough transform, to extract the linear geometry in the horizontal slice. For example, Okorn et al. [Okorn et al. 2010] examines floor plan modeling of wall structures to create blueprints from terrestrial laser scanning points. The direction of gravity (the vertical direction) is assumed to be known. A two-dimensional histogram is created from the points projected onto the ground plane. Linear structures from this histogram are then extracted using a Hough transform.

However, a floor plan modeling method based on only one single horizontal slice of the environment does not take the whole building interior environment information into consideration, which means some elements might be missing from the single slice. Thus, a single slice does not adequately represent the whole floor plan structure. Furthermore, it is difficult to determine the slice height most appropriate for generating the floor plan and therefore it is difficult to automatically select the height of the slice. Moreover, a single slice method does not filter out points obtained from the objects and clutter existing in the interior environment of the building, which further prevents the generation of a clear and accurate floor plan map. For point cloud data captured by terrestrial laser scanners, wall points near the floor surface are more likely to be obstructed by furniture and other clutter. Additionally, the wall points near the ceiling surface are likely to be obstructed by other MEP (mechanical, electrical, and plumbing) utilities or decorations.

On the other hand, a three-dimensional (3D) method first models the planar wall, floor, and ceiling surface and then creates the levels and floor plan information with a cross-section step. However, such a method is computation-heavy and due to the existence of noise and outliers, the wall, floor, and ceiling surface cannot be modeled perfectly.

Other related works on floor plan modeling/mapping have mainly focused on robotics research [Schröter et al. 2002]. Such floor plan maps are usually generated by robots equipped with laser scanners. The main purpose of the maps is for use in robotic navigation. Therefore, the research on generating these types of navigation maps do not place much emphasis on being highly accurate or complete.

In view of the above, it is desirable to extract/determine the level and floor plan information of a building from building point cloud data in an easy and efficient manner. Software tools are needed for processing point clouds to improve the ability to handle the enormous point clouds produced by laser scanners and to integrate the use of point cloud data into BIM modeling software.

SUMMARY OF THE INVENTION

Embodiments of the invention provide a computer-implemented method for extracting level information and reference grid information from point cloud data. To extract the levels and orthogonal reference grids from a terrestrial point cloud data of a building's interior, principal axis directions are first estimated by extracting plane normal information and then the point cloud data is transformed to make the building stand upright with the front side as the main façade surface. To address problems commonly associated with non-uniform point density, the transformed point cloud data is organized into a 3D voxel structure. Level information is then roughly extracted by detecting the peaks of a histogram generated by projecting the voxels along the X-axis and then refined by a plane-sweeping method. To extract the orthogonal reference grid information, the floor plan points are filtered by removing points belonging to large horizontal objects and selecting only points belonging to straight walls. After that, a histogram is generated by counting the occupied cells of the floor plan points projected onto the X-axis and Y-axis respectively. Peaks indicated in the histogram act as rough location markers for the reference grids and a line sweeping method is then employed to refine the location of reference grids.

BRIEF DESCRIPTION OF THE DRAWINGS

Referring now to the drawings in which like reference numbers represent corresponding parts throughout:

FIG. 4A depicts the front side of an illustrative building structure before principal axis adjustment. FIG. 4B depicts the left side of the building after principal axis adjustment. FIG. 4C depicts the front side of the building after principal axis adjustment;

FIG. 5A shows a histogram of voxels projected along a Z-axis. FIG. 5B illustrates the detection of three levels (locations of flooring/ceiling);

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

For building information model (BIM) modeling software, two main elements—levels and floor plans are critical for users authoring BIMs. This is the same case for when a user desires to create as-built BIMs of existing buildings from point cloud data because levels and floor plan information provide the main conceptual model of the building. Embodiments of the present invention provide methods to automatically extract the level and floor plan information from laser scanning points. The input data mainly comes from terrestrial laser scanners. In certain embodiments, orthogonal reference grid information is extracted to aid in the authoring of floor plan information.

Although methods such as RANSAC (RANdom SAmple Consensus) and Hough transforms have been proposed to extract 2D floor plan geometries from floor plan points, often it is still difficult to determine the accurate location of straight walls. One reason is that a wall has two faces and it is not clear which face has been scanned. Another reason is that the wall might not be well captured due to cluttering and occlusion factors. However, in common buildings, interior walls are usually designed with regular structures. Thus, extracting reference grids from extracted floor plan points provides a global overview of the floor plan, which can act as a good reference for straight wall reconstruction.

To extract the levels and orthogonal reference grids from a terrestrial point cloud data of a building interior, the principal axis directions of the point cloud data are first estimated with the extracted plane normal information. Then, the point cloud data is transformed to make the building stand upright with the front side as the main facade surface. To address the problems caused by non-uniform point density, the transformed point cloud data is organized into a three-dimensional (3D) voxel structure. Level information is then roughly extracted by detecting the histogram peaks generated by projecting the voxels along the X-axis and then refining the level information using a plane-sweeping method. To extract the orthogonal reference grid information, the floor plan points are first filtered by removing points that belong to large horizontal objects and selecting only points that belong to straight walls. Next, a histogram is generated by counting the occupied cells of the floor plan points projected onto the X-axis and Y-axis respectively. Histogram peaks act as rough location markers of the reference grids and a line sweeping method is then employed to refine the location of reference grids.

Hardware Environment

Figure 1:
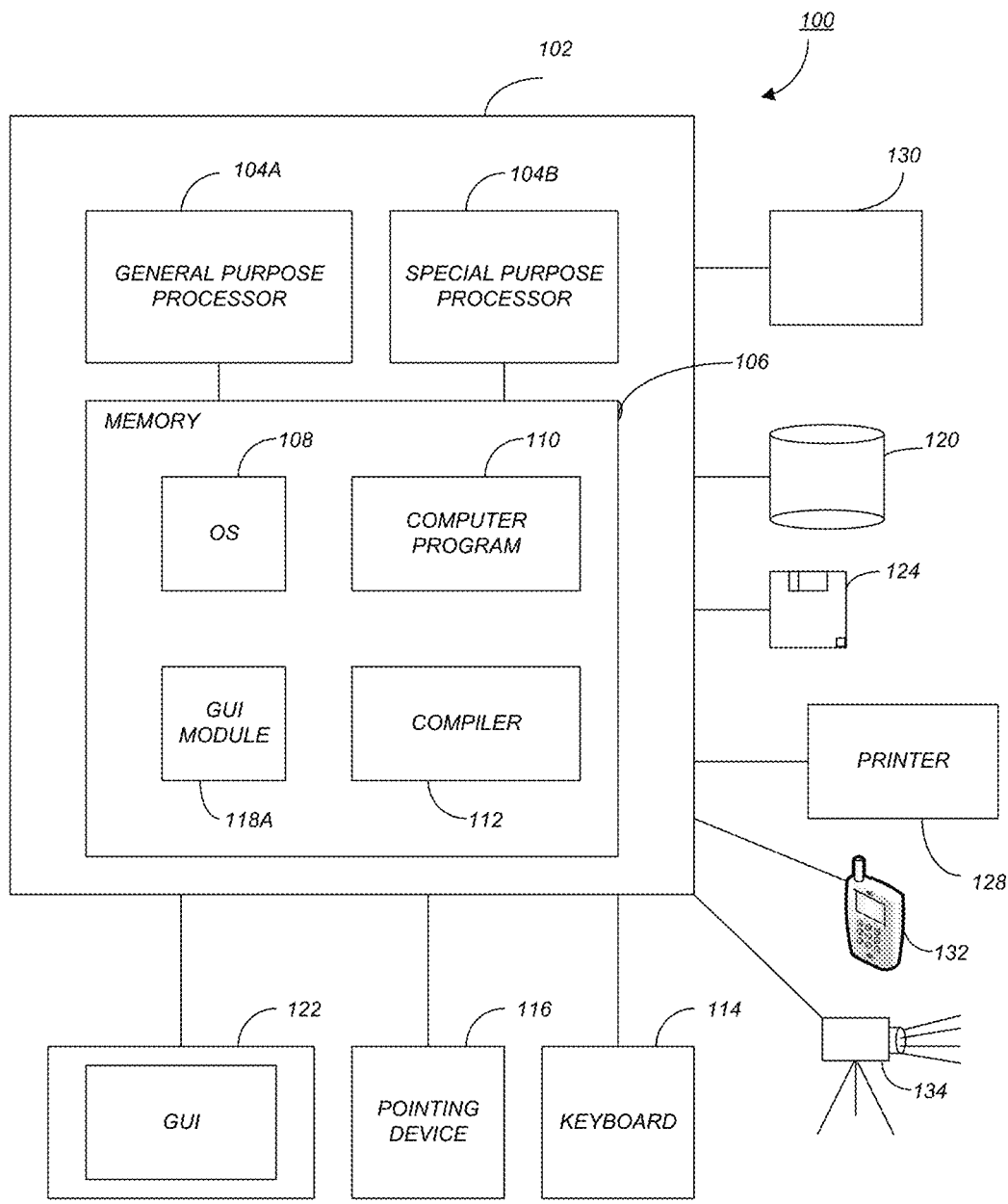
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, iPod™, Nook™, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one or more embodiments, computer 102 may be coupled to, and/or integrated with, a laser scanning device 134. Such a laser scanning device 134 is configured to scan an object or urban environment and obtain a digital representative of such an object/environment in the form of point cloud data that may be processed by the computer 102. Exemplary laser scanning devices 134 include terrestrial scanners (e.g. operated by hand or attached to a mobile device such as an automobile) as well as satellite based scanners.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118A. Although the GUI module 118A is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™ etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 that allows an application program 110 written in a programming language such as COBOL, Pascal, C++, FORTRAN, or other language to be translated into processor 104 readable code.

Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transient computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, cause the computer 102 to perform the steps necessary to implement and/or use the present invention or to load the program of instructions into a memory, thus creating a special purpose data structure causing the computer to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
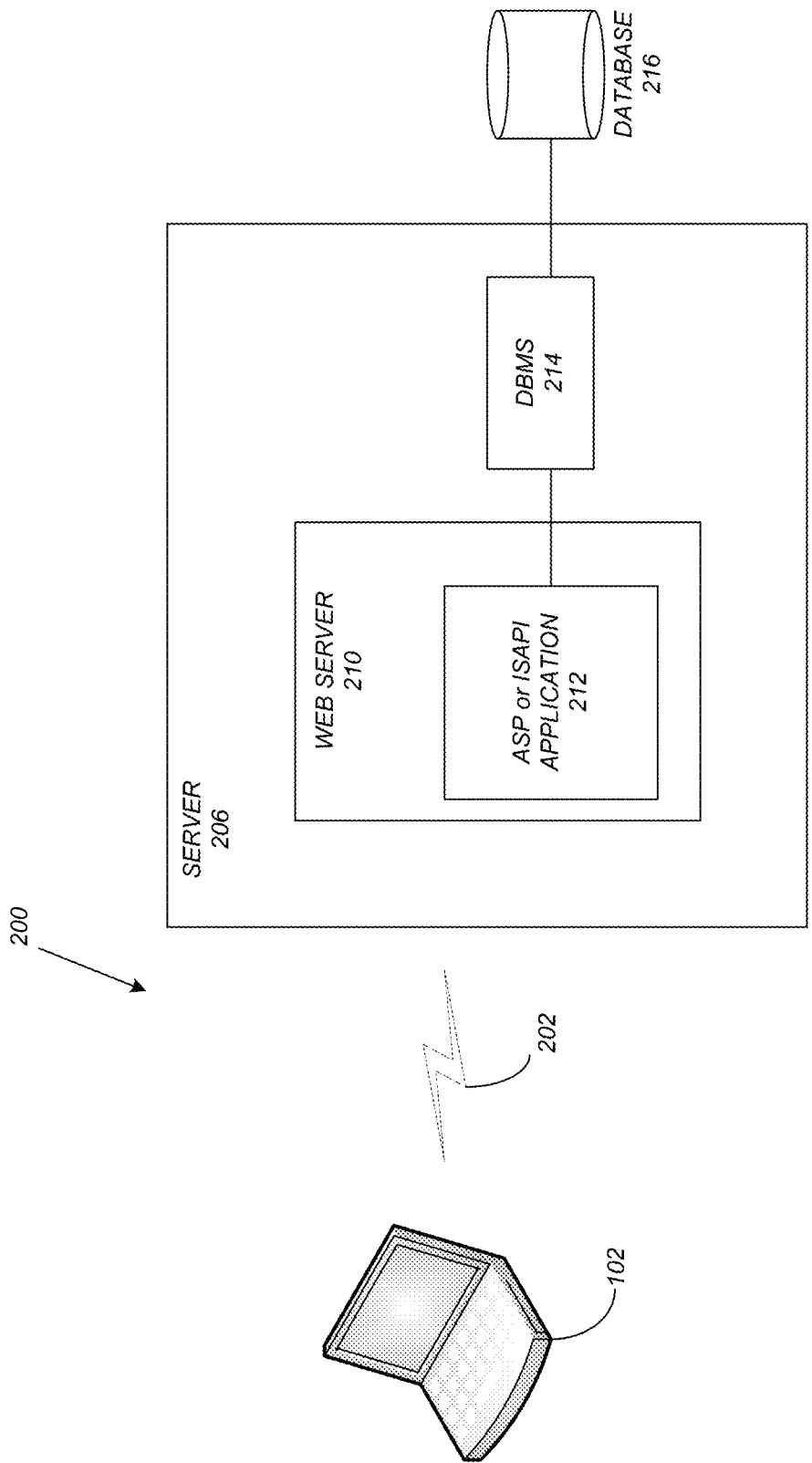
FIG. 2 schematically illustrates a typical distributed computer system using a network to connect client computers to server computers in accordance with one or more embodiments of the invention.

FIG. 2 schematically illustrates a typical distributed computer system 200 using a network 202 to connect client computers 102 to server computers 206. A typical combination of resources may include a network 202 comprising the Internet, LANs (local area networks), WANs (wide area networks), SNA (systems network architecture) networks, or the like, clients 102 that are personal computers or workstations, and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 102 and servers 206 in accordance with embodiments of the invention.

A network 202 such as the Internet connects clients 102 to server computers 206. Network 202 may utilize ethernet, coaxial cable, wireless communications, radio frequency (RF), etc. to connect and provide the communication between clients 102 and servers 206. Clients 102 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 102 may be downloaded from server computer 206 to client computers 102 and installed as a plug-in or ACTIVEX™ control of a web browser. Accordingly, clients 102 may utilize ACTIVEX™ components/component object model (COM) or distributed COM (DCOM) components to provide a user interface on a display of client 102. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 102 instead of communicating/obtaining the information from database 216 across network 202. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 102 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 102 and 206.

Software Embodiments

Embodiments of the invention are implemented as a software application on a client 102 or server computer 206. Further, as described above, the client 102 or server computer 206 may comprise a thin client device or a portable device that has a multi-touch-based display and that may comprise (or may be coupled to or receive data from) a 3D laser scanning device 134.

Figure 3:
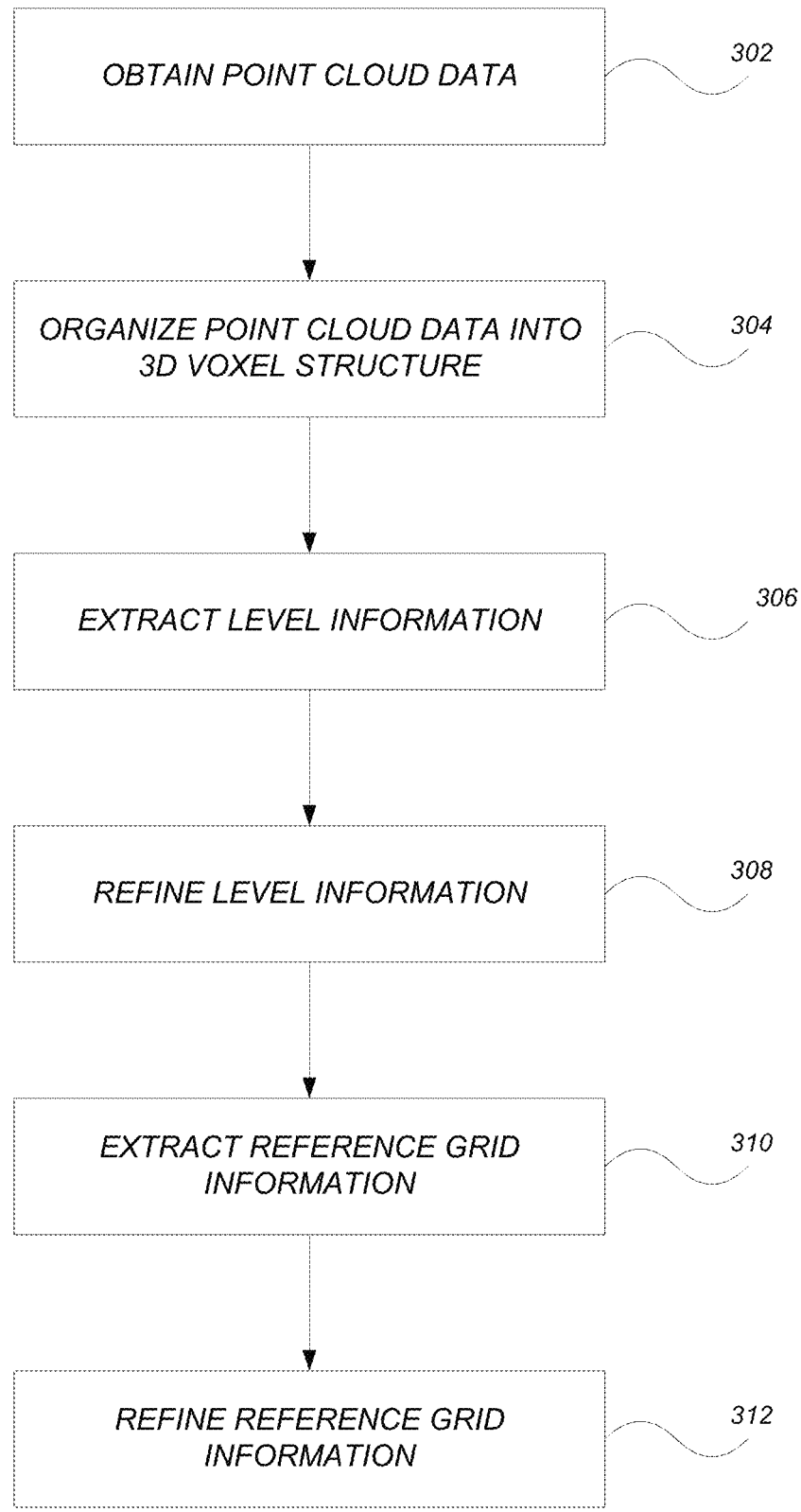
FIG. 3 is a flowchart illustrating the logical flow for performing a level and floor plan information extraction process, in accordance with one or more embodiments of the invention.

FIG. 3 is a flowchart illustrating the logical flow for performing a level and reference grid extraction process in accordance with one or more embodiments of the invention.

At step 302, point cloud data is obtained (e.g., from a building scan using a laser scanner). In one or more embodiments, the point cloud data comprises laser scanning points for a building.

At step 304, the point cloud data is organized into a three-dimensional (3D) structure of voxels, the three-dimensional structure consisting of an X-axis, Y-axis, and Z-axis. As used herein, a voxel represents a value on a regular grid in 3D space.

At step 306, rough level information is extracted from a Z-axis histogram of the voxels positioned along the Z-axis of the three-dimensional voxel structure.

At step 308, the extracted level information is refined.

At step 310, rough reference grid information is extracted from an X-axis histogram of the voxels positioned along the X-axis of the three-dimensional voxel structure and a Y-axis histogram of the voxels positioned along the Y-axis of the three-dimensional voxel structure.

At step 312, the extracted reference grid information is refined.

Details regarding the performance of one or more of the steps 302-312 are described below.

Principal Direction Estimation

In one or more embodiments of the building datum extraction method described herein, a basic precondition is that the point cloud data is adjusted beforehand to make the building stand upright and that the front of the building facade is parallel to the X-Z plane or the Y-Z plane. In most cases, this is already the orientation of the point cloud data. Otherwise this can be rectified by a coordinate system transformation using software provided by the laser scanner manufacturers. In one aspect of the invention, a method is provided to transform the point cloud data to make it stand upright. An important factor of the method is the estimation of the three principal directions of the point cloud data. In one embodiment, the method comprises extracting a principal direction of the point cloud data by determining X-axis, Y-axis, and Z-axis directions of the point cloud data. The point cloud data is then transformed such that a front face of the building is parallel to a plane defined by the X-axis and Z-axis or a plane defined by the Y-axis and Z-axis. The transformed point cloud data is then organized into the three-dimensional structure of voxels. In another embodiment, the method comprises extracting a principal axis of the point cloud data to form a coordinate system. The point cloud data is transformed with the coordinate system formed by the extracted principal axis. The transformed point cloud data is then organized into a three-dimensional voxel structure consisting an X-axis, Y-axis, and Z-axis.

Since the main component of a building are planes, in one or more embodiments of the invention, a RANSAC plane detection method [Schnabel et al. 2007] is used to detect all the planes existing in the point cloud data. To avoid the disturbance of small planar objects, only planes with areas larger than an area threshold are selected for further investigation.

It is assumed that the input point cloud data is registered from multiple scans of the building interior. In various embodiments, the laser scanners are mounted on the ground or a platform near the ground, which means that the density of the points on the building floor is larger than the point density on other building elements. Therefore, a simple way to determine the horizontal plane is to find the plane with most number of points and use the direction of the plane as the Z-axis (i.e. the Z-axis is parallel to the plane containing the greatest total number of laser scanning points).

Figure 4A:
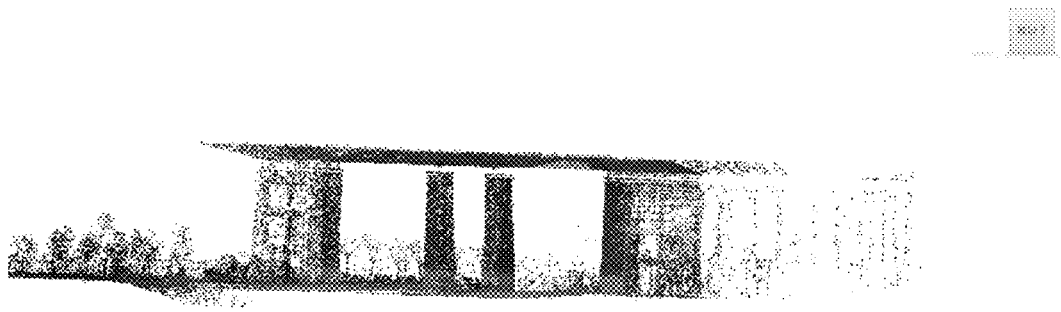
FIGS. 4A-4C illustrate result comparisons of a building point cloud before and after principal axis adjustment, in accordance with one or more embodiments of the invention.
Figure 4B:
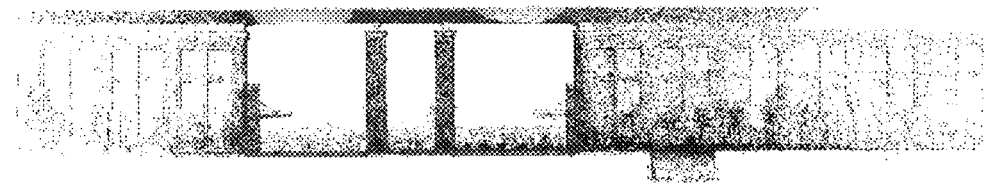
Figure 4C:
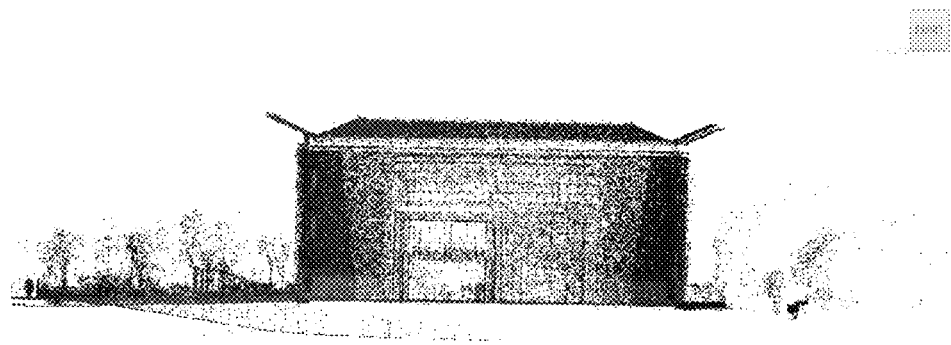

However, to make the algorithm more robust, a Gaussian sphere map $f[\alpha,\beta]$ can be generated by counting the number of points on the planes with different normal angles $[\alpha,\beta]$. The angle extreme or plane with the maximum number of points is intuitively selected as the Z-axis, with the other two angle extremes or planes comprising different normals being selected as the directions of the X- and Y-axes. The X- and Y-axes are constrained to be orthogonal with the Z-axis. In one embodiment, the method comprises determining one or more planes of the point cloud data. A Gaussian sphere map $f[\alpha,\beta]$ is generated by counting a total number of laser scanning points for the one or more planes with a different normal angle $[\alpha,\beta]$. The Z-axis is selected to be parallel to a direction of one or more of the one or more planes with the greatest total number of laser scanning points. The X-axis and Y-axis are selected to each be parallel to a separate plane with a normal angle orthogonal with the normal angle of the one or more planes parallel to the Z-axis. In certain situations, it may be difficult to distinguish the X-axis from the Y-axis. However, it is not difficult for a user to manually rotate the point cloud around the Z-axis for 90 degrees if the X-axis and Y-axis need to be swapped. After determination of the three principal axes, the whole point cloud data can be transformed to make it align well with the extracted new coordinate system. An illustrative result comparison of a building point cloud before and after principal axis adjustment is shown in FIGS. 4A-4C. FIG. 4A illustrates a front side of a building before principal axis adjustment. FIGS. 4B and 4C illustrate a left side and front side respectively, of a building after principal axis adjustment.

3D Voxel Construction

Step 302 provides for obtaining point cloud data (to be used for extracting level and reference grid information). In one or more embodiments of the invention, the building point cloud data used for datum extraction is acquired by terrestrial laser scanners mounted on the floors of each level and then combined together. The density near the scanner position is usually very dense and then decreases gradually as the distance increases, which presents a non-uniform density. In certain embodiments, a histogram is used to detect both level and grid information from building point clouds. Direct accumulation of the raw number of points biases the histogram toward regions near the scanner. When detecting datum information, area coverage is generally more important than the point sampling number. Therefore, a voxel-based structure is more appropriate to re-organize the point cloud data. Since the principal direction for the building point cloud has been adjusted as described above, an axis-aligned 3D voxel structure is reasonable and helpful in representing all of the building points.

At step 304 of FIG. 3, the point cloud data is organized into a 3D voxel structure. The whole point cloud data is re-organized into small voxels along the adjusted X, Y, and Z directions. First, the bounding box of the whole point cloud data is subdivided along the X, Y, and Z directions. The points are then distributed to each voxel. The dimension of a voxel can be adaptively set to be a multiple of the predefined threshold of scanner resolution c according to the memory capacity. A voxel with points inside is marked as a "NON-EMPTY" voxel; otherwise, it is an "EMPTY" voxel. This kind of voxel structure is a simple representation of space occupation. As further shown below, it is helpful to provide a rough estimation of the datum locations.

Multiple Levels Detection

For the point cloud data of building interiors, the location of the levels are mainly determined by the location of the floors and ceilings. As most floors and ceilings are primarily horizontal, the floor and ceiling planes should be perpendicular to the Z-axis after the principal axis adjustment. Although there are objects and clutter inside the building environment, the region covered by the floor and ceiling should still be relatively large when compared with the region covered by other cluttering objects. To roughly detect the density variations in a point occupied area, a height histogram is generated by accumulating the NON-EMPTY voxels along the Z-axis. The peaks in the histogram reveal the location of levels (e.g. floors and ceilings).

Rough Level Location Detection

At step 306 of FIG. 3, level information is extracted from the 3D voxel structure. In one embodiment, the method comprises extracting the level information from a Z-axis histogram of the voxels positioned along the Z-axis of the three-dimensional voxel structure. The voxels along the Z-axis contain at least one laser scanning point and a peak in the histogram identifies a rough location of the level. To roughly detect the location of the floors and ceilings, peaks are identified from the histogram projected along the Z-axis. Although it may be easy to visually identify the peaks in a small uni-variate histogram, various embodiments of the invention provided herein allow for automatically detecting the peaks from the histogram. As pointed in [Palshikar et al. 2009], a data point is a local peak if:

(a) It is a large and locally maximum value within a window, which is not necessarily a large or global maximum in the entire series; and (b) It is isolated, i.e., not too many points in the window have similar values.

Although many methods have been proposed in [Palshikar et al. 2009] to formalize the notion of a peak, certain embodiments of the invention utilize the method of an "outlier" detection idea after experimental evaluation, i.e., a peak should be an "outlier" when considered in the local context of a window of multiple points around it (for example 2000 points). Let m, s denote the mean and standard deviation of the neighboring data points around $x_i$. According to Chebyshev Inequality, a point in the histogram is identified as a peak if:

(i) $x_i \geq m$;

(ii) $|x_i - m| \geq hs$, for some suitably chosen h>0. The value of h can be set by the user. This criterion guarantees the peak is distinctive from most points in the neighborhood.

Since only the detection of the locations of floors and ceilings is wanted while large clutter, such as a meeting room table, is to be avoided, in further embodiments of the invention, two more criteria are added for the peak detection:

(iii) $s \geq \tau_s$, where $\tau_s$ is a standard deviation threshold, since it is expected that the region area of the level of floor or ceiling would vary a lot from its neighboring level;

(iv) $x_i \geq a$, where a is an area threshold. Usually it is difficult to set a global area threshold for this condition. In certain embodiments, the area threshold is determined adaptively based on the area A the building point cloud covers. To prevent the disturbance of outliers, the area the building spans is estimated by projecting the voxel structure to the X-Y-plane and counting the number of NON-EMPTY cells in the 2D projection. A cell in the 2D projection is a NON-EMPTY cell if any of its corresponding 3D voxels is NON-EMPTY. Therefore, it is set $\alpha = \varepsilon \cdot A$. By default, $\varepsilon$ is set to 0.5, but this value may be adjusted by the user.

Figure 5A:
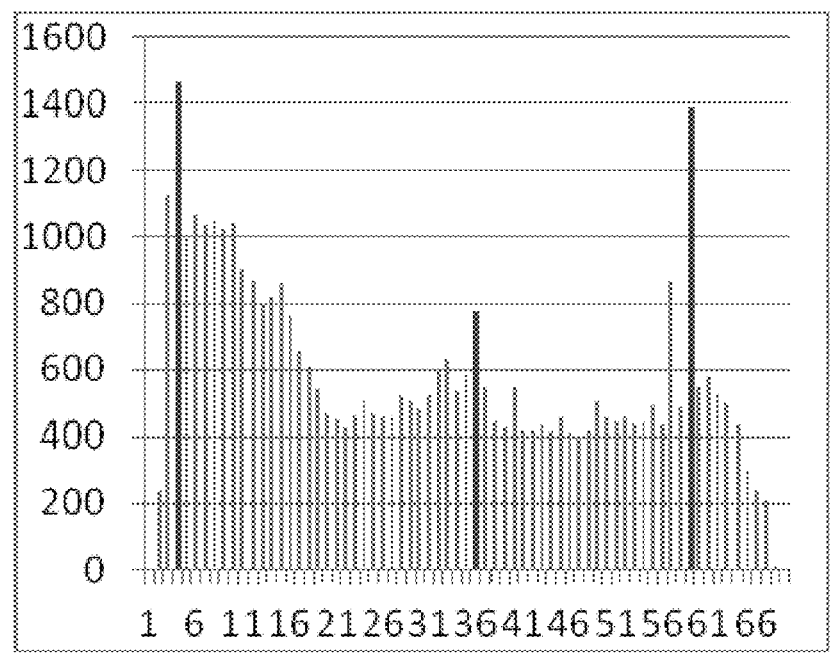
FIGS. 5A and 5B depict level detection in the point cloud data of the illustrative building structure, in accordance with one or more embodiments of the invention.
Figure 5B:
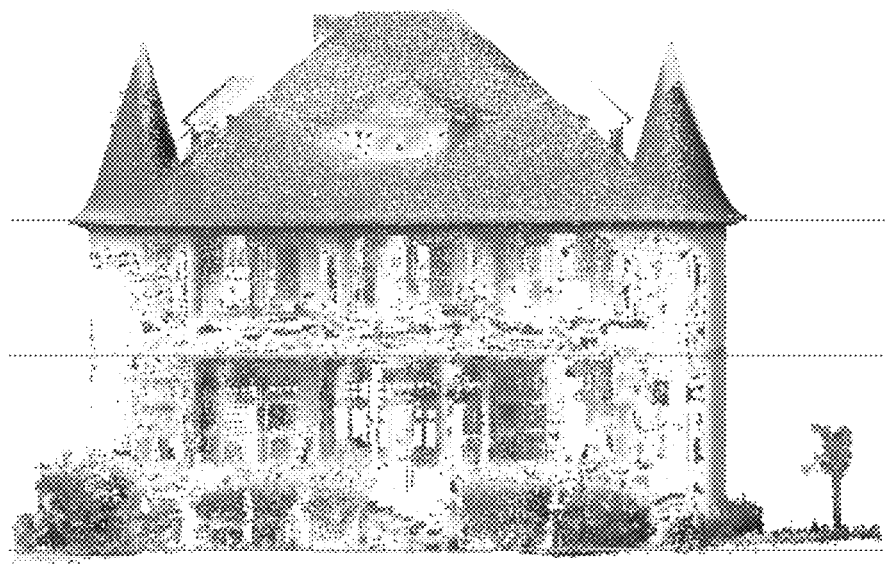

With the above four criteria, peaks will be detected from the histogram. While not all the detected peaks are true peaks, post-processing may be applied to filter out peaks that are too close together and retain the ones with a bigger significance $|x_i - m|$. FIG. 5A illustrates a histogram of voxels projected along the Z-axis in accordance with one or more embodiments of the invention. As shown in FIG. 5A, three peaks (bolded lines) are detected for the building point cloud data. As shown in FIG. 5B, these peaks roughly represent the locations of the floors and ceilings.

Level Location Refinement by Plane Sweeping

At step 308 of FIG. 3, the extracted level information is refined. Since the histogram used in the previous section is accumulated with a granularity of the dimension of a voxel, it may still be too coarse for use. In one or more embodiments, the extracted level location is further refined by plane sweeping.

Each detected rough peak voxel level represents one floor or one ceiling located inside the voxel. In this step, the original point count is used instead of the represented voxels to check the density variation inside a voxel dimension range. A 2D line-sweeping algorithm is applied to detect the density variation and to find the accurate location of the floor or ceiling.

Two parallel sweep planes with a small interval are instantiated for the X-Y plane and swept along the Z-axis from the bottom to the top of the peak voxel level. The number of points located between the parallel sweep planes is counted. Point number changes along the sweeping path between both sides of the sweep plane are accumulated. The extreme value of the accumulated point number is selected as the position of the refined level location. It should be noted that the interval determines the resolution of the level location. As an example, the result of level location refinement is shown in FIG. 5B. In one embodiment, the method comprises moving two parallel sweep planes defined by the X-axis and Y-axis in successive positions along the Z-axis of the point cloud data in a peak voxel. The two parallel sweep planes are separated by an interval value in the Z-axis direction. The total number of laser scanning points within the interval value of the two parallel sweep planes is calculated for each position along the Z-axis. The position along the Z-axis with the greatest total number of laser scanning points is selected as a refined level location.

Orthogonal Reference Grid Detection

After the locations of the floors and ceilings have been detected, this information is then used to segment the whole facility into several level regions and to handle the points level by level. This will remove the interference of points from different levels and generate a reference grid for each level. Reference grids provide a good reference in building information modeling (BIM) (e.g. using building design software such as Autodesk™ Revit™) for straight wall reconstruction and floor plan authoring using point cloud data as a reference. Thus, in one or more embodiments, the building is segmented by level and a reference grid is generated for each level.

Floor Plan Points

Figure 6:
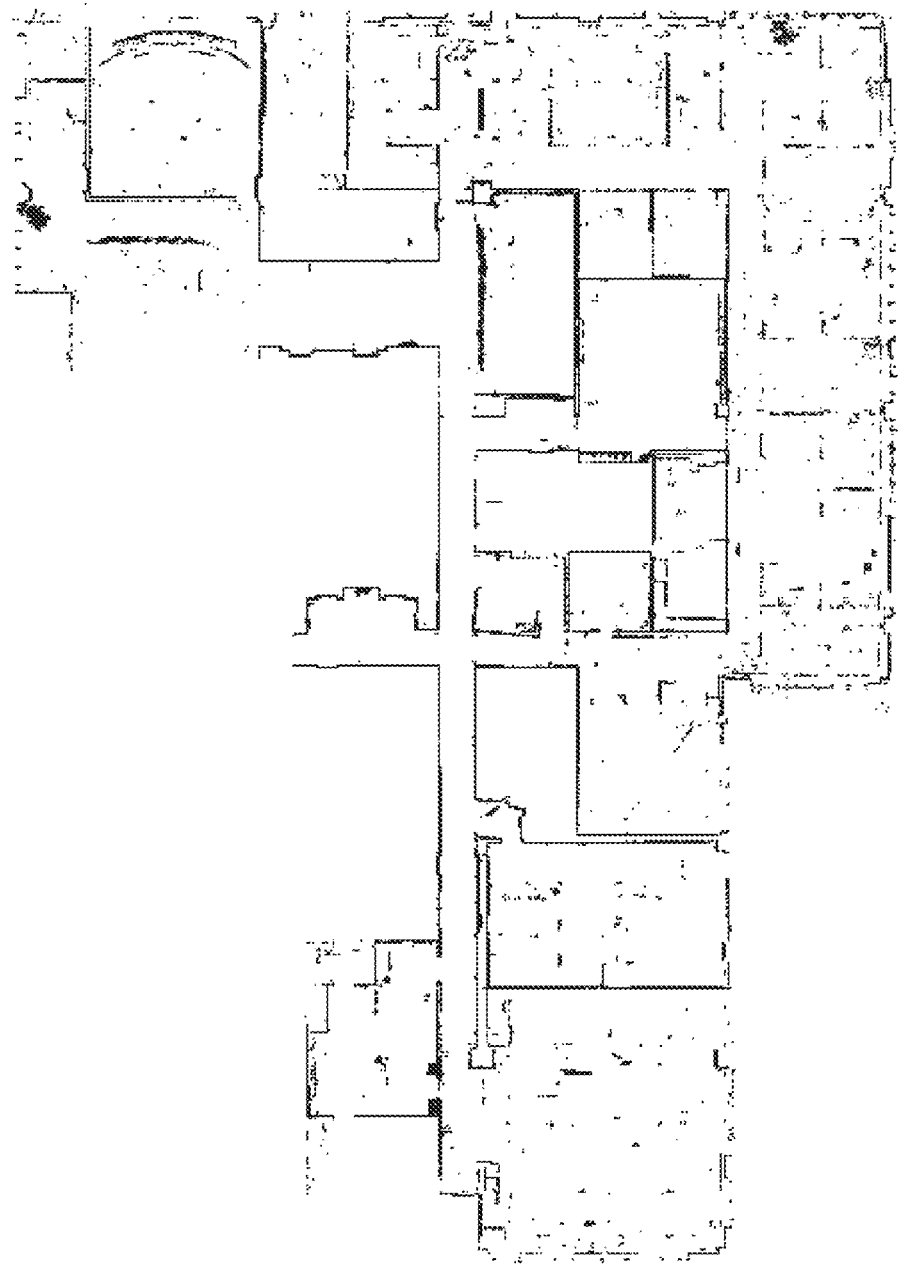
FIG. 6 depicts the remaining floor plan points for the illustrative building structure after floor, ceiling, and large horizontal objects are removed, in accordance with one or more embodiments of the invention.

When the segmented point cloud data of each level are projected directly to the X-Y plane, the floor and ceiling points cover the whole area and hide the location of the wall points. Therefore, in certain embodiments, the horizontal objects which cover big regions such as floor, ceiling, and big tables are removed. By setting a smaller area threshold (as described in the Rough Level Location Detection section), the level detection method can also be employed to remove other horizontal regions such as tables from the points in one level region. After this step, the interior structure will appear clearly as shown in FIG. 6. Thus, FIG. 6 illustrates the remaining points after floor, ceiling, and large horizontal objects are removed, in accordance with one or more embodiments of the invention. However, there are still points of clutters existing in the remaining projected points. Since the main goal is to detect reference grid lines, the method focuses on wall points. Therefore, the points that do not belong to wall surfaces are further filtered out.

Figure 7:
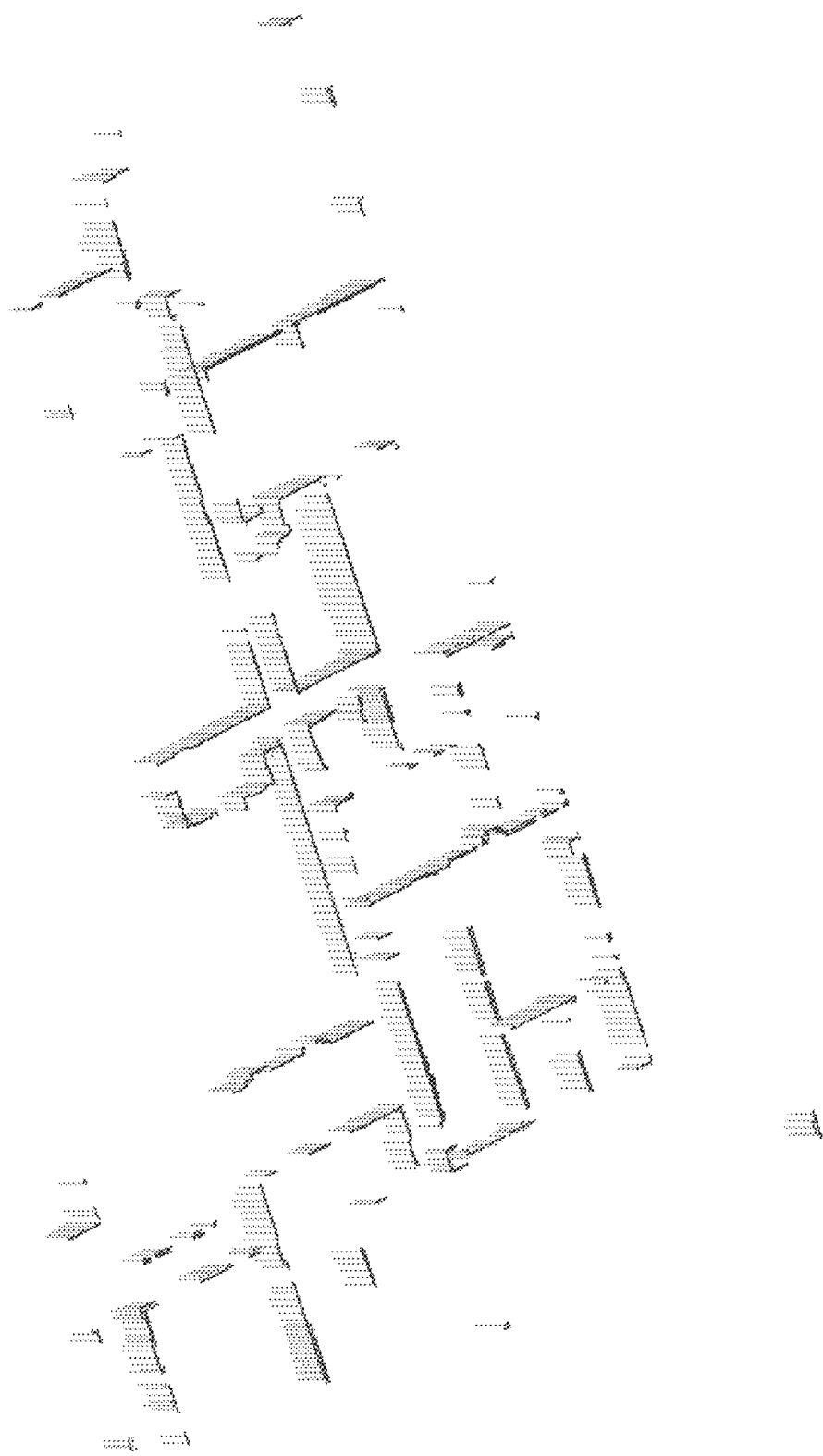
FIG. 7 depicts a histogram of the number of voxels at the floor plan points location of the illustrative building structure, in accordance with one or more embodiments of the invention.

Based on the observation mentioned in [Okorn et al. 2010], the number of points from each height level in the height histogram may vary significantly as a function of height while the number of wall points should be fairly constant throughout the range. Therefore, it is reasonable to select only some representative cross-section of points for the floor plan points. So, in a second step, a height histogram is recalculated for the points remaining after the removal of big horizontal objects. FIG. 7 illustrates a histogram of the number of voxels at the floor plan points location in accordance with one or more embodiments of the invention. The cross-sections are sorted by histogram values in increasing order. Cross-sections with bigger height histogram values are discarded by floor plan points filtering.

To generate reference grid lines for walls, the focus is mainly on straight walls. In a third step, the points in the remaining voxels are further examined. In one embodiment, for each voxel, the neighboring 3*3*3 voxels are obtained, and the points in the neighboring voxels are checked to see if they form a vertical plane (i.e. parallel to the Z-axis). If yes, this voxel is kept, otherwise it is discarded.

In a fourth step, the remaining voxels are projected onto an X-Y plane and the number of NON-EMPTY voxels is accumulated to form a 2D histogram. It is assumed that the detected walls are solid walls, which means more points should be generated during the laser scanning process. Therefore, a threshold is set to filter out the voxels with too few vertical points.

Figure 8:
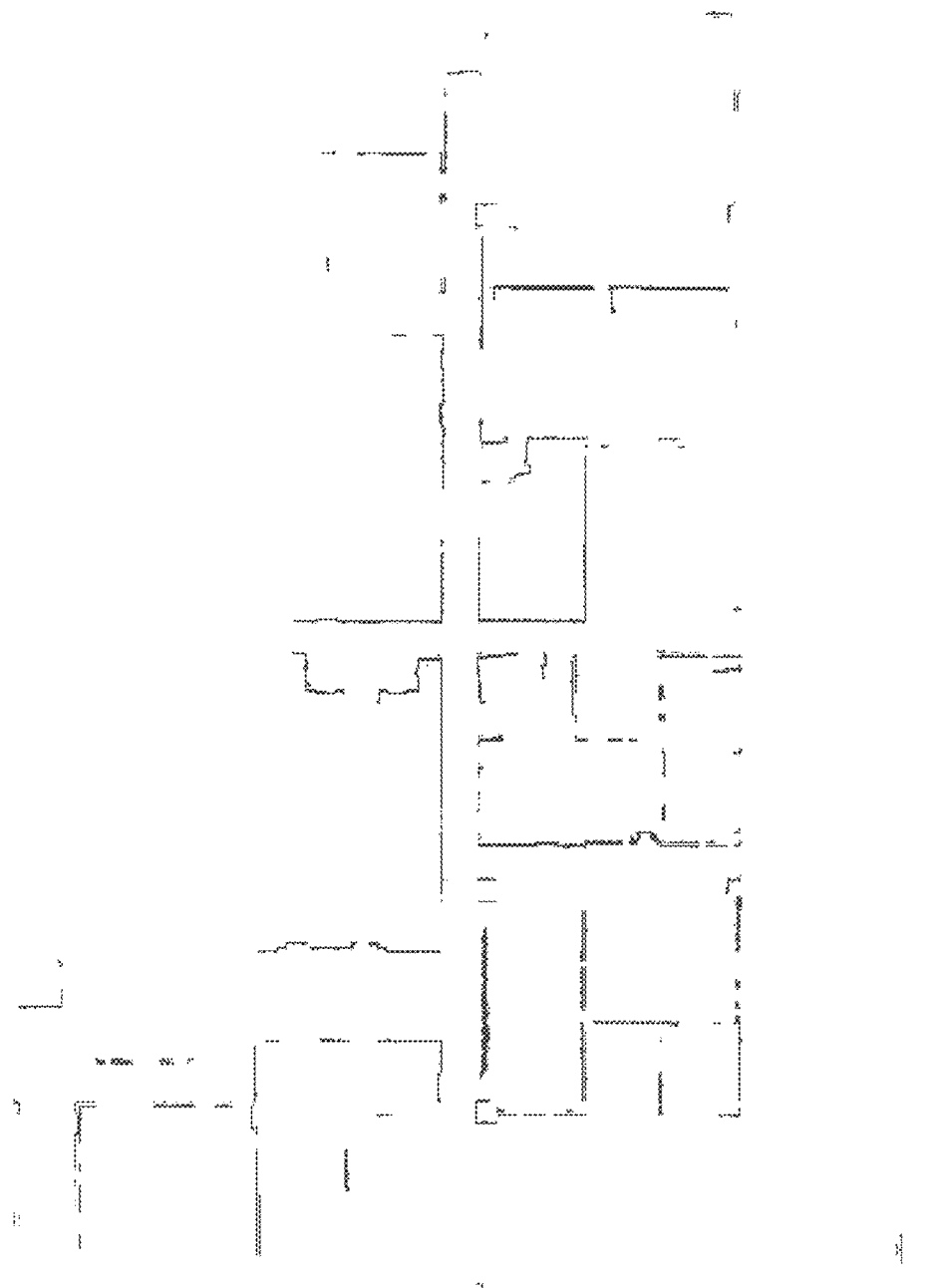
FIG. 8 depicts the floor plan points of the illustrative building structure after filtering, in accordance with one or more embodiments of the invention.

After these steps, the wall points projected onto the X-Y plane can be generated, as shown in FIG. 8. These projected wall points show a rough floor plan structure. In other words, FIG. 8 illustrates floor plan points after filtering in accordance with one or more embodiments of the invention.

In one embodiment, the method comprises removing floor and ceiling points from the point cloud data. A height histogram of the point cloud data is generated and laser scanning points above a maximum value on the height histogram are removed. Voxels with neighboring voxels that consist of laser scanning points that form a plane parallel to the Z-axis are retained. A two-dimensional X-Y histogram of the retained voxels that contain at least one laser scanning point is generated and voxels with a total number of laser scanning points below a minimum value are removed. Wall locations are then extracted from the two-dimensional X-Y histogram.

Reference Grid Extraction

Figure 9:
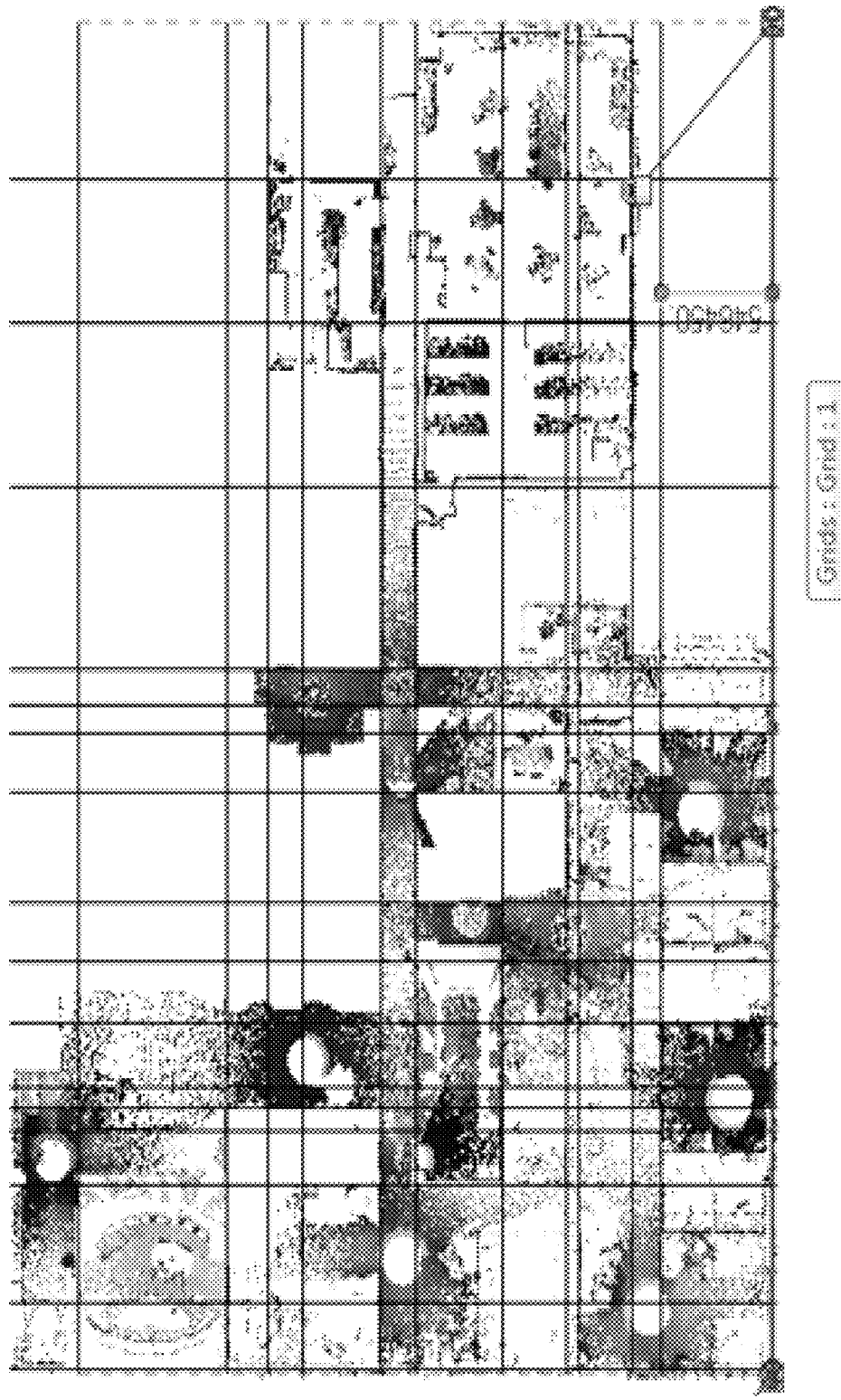
FIG. 9 depicts the reference grids of floor plans of the illustrative building structure, in accordance with one or more embodiments of the invention.

At step 310 of FIG. 3, reference grid information is extracted from the 3D voxel structure. To extract the reference grids for the straight walls, a similar histogram technique (as described previously in Rough Level Location Detection section) is used to extract the reference grid structure. The only differences are that the floor plan points are projected on 2D space and the reference grids are extracted along both the X-axis and Y-axis. The following steps are employed to extract the reference grid lines:

1) The floor plan points are organized into a 2D grid structure in the first step and points are discretized into the cells. The reason is similar to what was explained in the 3D Voxel Construction section: Due to the laser scanner sampling density difference, counting the absolute number of floor plan points will directly bias the histogram;
2) The number of NON-EMPTY cells in each row of the 2D grid is counted and a histogram is formed along the Y-axis. The local peaks in the histogram are detected using the method described above (Rough Level Location Detection). In one embodiment, the Y-axis histogram comprises voxels along the Y-axis that contain at least one laser scanning point. A peak in the Y-axis histogram identifies a rough wall location or location marker of the reference grid. After that, the peak value for each local peak row is refined using the method described in Level Location Refinement by Plane Sweeping section (step 312 of FIG. 3). The only difference is that a line sweeping method is used instead of a plane sweeping method here to refine the extracted reference grid information. The detected peaks are regarded as the locations of the reference grids along the Y-axis. In one embodiment, two parallel sweep lines are moved in successive positions along the Y-axis of the point cloud data in a peak voxel. The two parallel sweep lines are separated by an interval value in the Y-axis direction. The total number of laser scanning points within the interval value of the two parallel sweep lines is calculated for each position along the Y-axis. The position along the Y-axis with the greatest total number of laser scanning points is also selected as a refined wall location on the reference grid;
3) The number of NON-EMPTY cells in each column of the 2D grid is counted and a histogram is formed along the X-axis. Then the same method described above (step 2) is used to extract and refine the locations of the reference grids along the X-axis. In one embodiment, the X-axis histogram comprises voxels along the X-axis that contain at least one laser scanning point. A peak in the X-axis histogram identifies a rough wall location or location marker of the reference grid. In a further embodiment, two parallel sweep lines are moved in successive positions along the X-axis of the point cloud data in a peak voxel. The two parallel sweep lines are separated by an interval value in the X-axis direction. The total number of laser scanning points within the interval value of the two parallel sweep lines is calculated for each position along the X-axis. The position along the X-axis with the greatest total number of laser scanning points is also selected as a refined wall location on the reference grid;

A final result of reference grids of floor plans is shown in FIG. 9. In this example, the reference grids were created in Autodesk™ Revit™.

Figure 10:
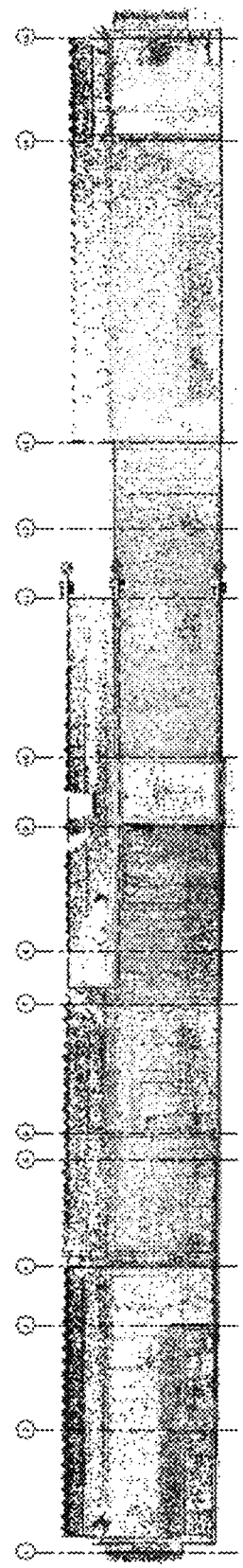
FIG. 10 depicts the extracted datum information from the building point cloud data of the illustrative building structure, in accordance with one or more embodiments of the invention.

Embodiments of the invention provide a method to extract the level information and orthogonal reference grids for floor plans of a building scanned by terrestrial laser scanners. The validity of this method has been evaluated (e.g., on the Autodesk™ Revit™ platform) as shown in FIG. 10. In this regard, FIG. 10 illustrates extracted datum information from the building's point cloud in accordance with one or more embodiments of the invention. The extracted datum information provides an overview of the level and floor plan information of the building interior and helps with reconstructing a detailed blueprint of the building from point cloud data.

Building retrofit is a big market and is still rapidly expanding. More and more required output has been shifted from 2D drawings to 3D BIMs, which means that there is a strong need for BIM software in creating as-built models from laser scanning data for existing buildings. Specifically, the creation of blueprints of the existing conditions of buildings is a common task in the AEC domain. Currently, it is understood that no intelligent floor plan generation tools have been provided in existing commercial software. The method provided herein allows for automatic extraction of datum information including levels and orthogonal reference grids from laser scanning data of building interiors, which provides helpful information that aids blueprint creation and reduces a user's labor in the reconstruction process.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[Adan et al. 2011] Antonio Adan, Xuehan Xiong, Burcu Akinci, and Daniel Huber. Automatic Creation of Sementiacally Rich 3D Building Models from Laser Scanner Data, *Proceedings of the International Symposium on Automation and Robotics in Construction (ISARC)*, June, 2011;

[Huber et al. 2010] Daniel Huber, Pingbo Tang, Antonio Adan, Brian Okorn, and Xuehan Xiong. Using Laser Scanners for Modeling and Analysis in Architecture, Engineering, and Construction. *In Proceedings of the Conference on Information Sciences and Systems (CISS)*, Princeton, NJ, 2010;

[Dorninger et al. 2008] Dorninger, P. and Pfeifer, N. A comprehensive automated 3D approach for building extraction, reconstruction and regularization from Airborne Laser Scanning Point Clouds, Sensors 2008, Vol. 8, 7323-7343;

[Palshikar et al. 2009] Girish Keshav Palshikar, 2009, Simple Algorithms for Peak Detection in Time-Series, *In Proceedings of 1st IIMA International Conference on*

*Advanced Data Analysis, Business Analytics and Intelligence*, Ahmedabad, India, June 2009;

[Li et al. 2011] Li, W., Wolberg, G., and Zokai, S., 2011, Lightweight 3D Modeling of Urban Buildings from Range Data. *In: 3DIMPVT IEEE* (2011), p. 124-131;

[Nguyen et al. 2005] Nguyen, V. Gachter, S. Martinelli, A. Tomatis, N. Siegwart, R. A Comparison Of Line Extraction Algorithms Using 2d Range Data For Indoor Mobile Robotics, *In Proc. of the IEEE/RSJ International Conference on Intelligent Robots and Systems, IROS*, 2005, p. 1929-1934;

[Okorn et al. 2010] Okorn B., Xiong X., Akinci K. and Huber D, 2010, Toward Automated Modeling of Floor Plans, *in. Proceedings of the Symposium on 3D Data. Processing, Visualization and Transmission, Paris, France,* 2010;

[Schnabel et al. 2007] Schnabel, R., Wahl, R. and Klein, R. 2007, Efficient RANSAC for Point-Cloud Shape Detection. *Computer Graphics Forum,* 26: 214-226;

[Schindler et al. 2003] Schindler, K., and Bauer, J. 2003. A model-based method for building reconstruction. *In Proc. of IEEE Workshop on Higher Level Knowledge in 3D Modeling and Motion Analysis,* 74; and

[Schroter et al. 2002] Schroter, D. Beetz, M., and Gutmann, J.-S., 2002, RG mapping: Learning compact and structured 2d line maps of indoor environments, *in: Proceedings of the IEEE International Workshop on Robot and Human Interactive Communication, ROMAN'02,* 2002.

What is claimed is:

1. A computer-implemented method for extracting floor plan information for a building interior from point cloud data, comprising:
    (a) obtaining point cloud data, of the building interior, comprising laser scanning points of a building;
    (b) estimating a principal axis direction of the point cloud data;
    (c) transforming the point cloud data by adjusting the principal axis direction, wherein after transforming, the building stands upright;
    (d) organizing the point cloud data into a three-dimensional structure of voxels, the three-dimensional structure consisting of an X-axis, Y-axis, and Z-axis, wherein each voxel represents a value on a regular grid in three-dimensional space;
    (e) accumulating non-empty voxels along the Z-axis to generate a Z-axis histogram;
    (f) extracting level information from the Z-axis histogram, wherein peaks of the Z-axis histogram identify a location of floors and ceilings of the building interior, wherein a point $x_i$ in the Z-axis histogram is identified as a peak if:
        i) $x_i$ is greater than or equal to the mean m of neighboring points around $x_i$;
        ii) an absolute value of $x_i$ minus m is greater than or equal to the standard deviation s of the neighboring points around the peak $x_i$ multiplied by a value h predefined by the user;
        iii) s is greater than or equal to a standard deviation threshold $\tau_s$; and
        iv) $x_i$ is greater than or equal to an area threshold a for a surface area;
    (g) segmenting the building interior by level and processing each level separately;
    (h) for each level:
        (1) finding one or more straight walls by examining, for each non-empty voxel, neighboring voxels, and retaining voxels that form a vertical plane;
        (2) projecting remaining voxels onto an 2D XY plane;
        (3) accumulating non-empty voxels in each row of the 2D XY plane to form a Y-histogram along the Y-axis;
        (4) accumulating non-empty voxels in each column of the 2D XY plane to form a X-histogram along the X-axis; and
        (5) generating a reference grid of a floor plan based on peaks from the X-histogram and the Y-histogram.

2. The computer-implemented method of claim 1 further comprising refining the extracted level information by plane sweeping to detect a density variation inside of a voxel dimension range.

3. The computer-implemented method of claim 1 further comprising:
    for each level, removing points representing horizontal objects by removing points that cover an area greater than a region threshold.

4. The computer-implemented method of claim 3 further comprising:
    re-computing the Z-axis histogram after the points representing horizontal objects have been removed; and
    filtering out points corresponding to histogram values in the Z-axis histogram above a maximum value.

5. The computer-implemented method of claim 1 wherein:
    the X-axis histogram comprises voxels along the X-axis that contain at least one laser scanning point and the Y-axis histogram comprises voxels along the Y-axis that contain at least one laser scanning point; and
    a peak in the X-axis histogram or Y-axis histogram identifies a rough wall location on the reference grid.

6. The computer-implemented method of claim 1 further comprising refining the extracted reference grid information by line sweeping.

7. A system for extracting floor plan information for a building interior from point cloud data in a computer system comprising:
    (a) a computer having a memory; and
    (b) an application executing on the computer, wherein the application:
        (1) obtains point cloud data, of the building interior, comprising laser scanning points of a building;
        (2) estimates a principal axis direction of the point cloud data;
        (3) transforms the point cloud data by adjusting the principal axis direction, wherein after transforming, the building stands upright;
        (4) organizes the point cloud data into a three-dimensional structure of voxels, the three-dimensional structure consisting of an X-axis, Y-axis, and Z-axis, wherein each voxel represents a value on a regular grid in three-dimensional space;
        (5) accumulates non-empty voxels along the Z-axis to generate a Z-axis histogram;
        (6) extracts level information from the Z-axis histogram, wherein peaks of the Z-axis histogram identify a location of floors and ceilings of the building interior wherein a point $x_i$ in the Z-axis histogram is identified as a peak if:
            i) $x_i$ is greater than or equal to the mean m of neighboring points around $x_i$;
            ii) an absolute value of $x_i$ minus m is greater than or equal to the standard deviations of the neighboring points around the peak $x_i$ multiplied by a value h predefined by the user;
            iii) s is greater than or equal to a standard deviation threshold $\tau_s$; and iv) $x_i$ is greater than or equal to an area threshold a for a surface area;
(7) segments the building interior by level and processing each level separately;
(8) for each level:
(i) finds one or more straight walls by examining, for each non-empty voxel, neighboring voxels, and retaining voxels that form a vertical plane;
(ii) projects remaining voxels onto an 2D XY plane;
(iii) accumulates non-empty voxels in each row of the 2D XY plane to form a Y-histogram along the Y-axis;
(iv) accumulates non-empty voxels in each column of the 2D XY plane to form a X-histogram along the X-axis; and
(v) generates a reference grid of a floor plan based on peaks from the X-histogram and the Y-histogram.

8. The system of claim 7 wherein the application further refines the extracted level information by plane sweeping to detect a density variation inside of a voxel dimension range.

9. The system of claim 7 wherein the application further:
for each level, removes points representing horizontal objects by removing points that cover an area greater than a region threshold.

10. The system of claim 9 wherein the application further:
re-computes the Z-axis histogram after the points representing horizontal objects have been removed; and
filters out points corresponding to histogram values in the Z-axis histogram above a maximum value.

11. The system of claim 7 wherein:
the X-axis histogram comprises voxels along the X-axis that contain at least one laser scanning point and the Y-axis histogram comprises voxels along the Y-axis that contain at least one laser scanning point; and
a peak in the X-axis histogram or Y-axis histogram identifies a rough wall location on the reference grid.

12. The system of claim 7 wherein the application further refines the extracted reference grid information by line sweeping.

13. A computer-implemented method for extracting floor plan information for a building interior from point cloud data, comprising:
(a) obtaining point cloud data, of the building interior, comprising laser scanning points of a building;
(b) estimating a principal axis direction of the point cloud data, wherein:
the principal axis direction of the point cloud data is based on a point density; and
a plane with a highest density is determined;
(c) transforming the point cloud data by adjusting the principal axis direction, wherein after transforming, the building stands upright;
(d) organizing the point cloud data into a three-dimensional structure of voxels, the three-dimensional structure consisting of an X-axis, Y-axis, and Z-axis, wherein each voxel represents a value on a regular grid in three-dimensional space, wherein the Z-axis is determined to be parallel to the plane with the highest density;
(e) accumulating non-empty voxels along the Z-axis to generate a Z-axis histogram;
(f) extracting level information from the Z-axis histogram, wherein peaks of the Z-axis histogram identify a location of floors and ceilings of the building interior;
(g) segmenting the building interior by level and processing each level separately; and
(h) for each level:
(1) finding one or more straight walls by examining, for each non-empty voxel, neighboring voxels, and retaining voxels that form a vertical plane;
(2) projecting remaining voxels onto an 2D XY plane;
(3) accumulating non-empty voxels in each row of the 2D XY plane to form a Y-histogram along the Y-axis;
(4) accumulating non-empty voxels in each column of the 2D XY plane to form a X-histogram along the X-axis; and
(5) generating a reference grid of a floor plan based on peaks from the X-histogram and the Y-histogram.

14. A system for extracting floor plan information for a building interior from point cloud data in a computer system comprising:
(a) a computer having a memory; and
(b) an application executing on the computer, wherein the application:
(1) obtains point cloud data, of the building interior, comprising laser scanning points of a building;
(2) estimates a principal axis direction of the point cloud data, wherein:
the principal axis direction of the point cloud data is based on a point density; and
a plane with a highest density is determined;
(3) transforms the point cloud data by adjusting the principal axis direction, wherein after transforming, the building stands upright;
(4) organizes the point cloud data into a three-dimensional structure of voxels, the three-dimensional structure consisting of an X-axis, Y-axis, and Z-axis, wherein each voxel represents a value on a regular grid in three-dimensional space;
(5) accumulates non-empty voxels along the Z-axis to generate a Z-axis histogram, wherein the Z-axis is determined to be parallel to the plane with the highest density;
(6) extracts level information from the Z-axis histogram, wherein peaks of the Z-axis histogram identify a location of floors and ceilings of the building interior;
(7) segments the building interior by level and processing each level separately;
(8) for each level:
(i) finds one or more straight walls by examining, for each non-empty voxel, neighboring voxels, and retaining voxels that form a vertical plane;
(ii) projects remaining voxels onto an 2D XY plane;
(iii) accumulates non-empty voxels in each row of the 2D XY plane to form a Y-histogram along the Y-axis;
(iv) accumulates non-empty voxels in each column of the 2D XY plane to form a X-histogram along the X-axis; and
(v) generates a reference grid of a floor plan based on peaks from the X-histogram and the Y-histogram.

15. A computer-implemented method for extracting floor plan information for a building interior from point cloud data comprising:
(a) obtaining point cloud data, of the building interior, comprising laser scanning points of a building;
(b) estimating a principal axis direction of the point cloud data;
(c) transforming the point cloud data by adjusting the principal axis direction, wherein after transforming, the building stands upright;

(d) organizing the point cloud data into a three-dimensional structure of voxels, the three-dimensional structure consisting of an X-axis, Y-axis, and Z-axis, wherein each voxel represents a value on a regular grid in three-dimensional space;

(e) accumulating non-empty voxels along the Z-axis to generate a Z-axis histogram;

(f) extracting level information from the Z-axis histogram, wherein peaks of the Z-axis histogram identify a location of floors and ceilings of the building interior;

(g) segmenting the building interior by level and processing each level separately; and (h) for each level:
  (1) removing floor and ceiling points from the point cloud data;
  (2) generating a height histogram of the point cloud data and removing laser scanning points above a maximum value on the height histogram;
  (3) retaining voxels with neighboring voxels that consist of laser scanning points that form a plane parallel to the Z-axis;
  (4) generating a two-dimensional X-Y histogram of the retained voxels that contain at least one laser scanning point and removing voxels with a total number of laser scanning points below a minimum value; and
  (5) extracting wall locations from the two-dimensional X-Y histogram;
  (6) generating a reference grid by:
    (i) finding one or more straight walls by examining, for each non-empty voxel, neighboring voxels, and retaining voxels that form a vertical plane;
    (ii) projecting remaining voxels onto an 2D XY plane;
    (iii) accumulating non-empty voxels in each row of the 2D XY plane to form a Y-histogram along the Y-axis;
    (iv) accumulating non-empty voxels in each column of the 2D XY plane to form a X-histogram along the X-axis; and
    (v) generating the reference grid of a floor plan based on peaks from the X-histogram and the Y-histogram.

16. A system for extracting floor plan information for a building interior from point cloud data in a computer system comprising:

(a) a computer having a memory; and (b) an application executing on the computer, wherein the application:
  (1) obtains point cloud data, of the building interior, comprising laser scanning points of a building;
  (2) estimates a principal axis direction of the point cloud data;
  (3) transforms the point cloud data by adjusting the principal axis direction, wherein after transforming, the building stands upright;
  (4) organizes the point cloud data into a three-dimensional structure of voxels, the three-dimensional structure consisting of an X-axis, Y-axis, and Z-axis, wherein each voxel represents a value on a regular grid in three-dimensional space;
  (5) accumulates non-empty voxels along the Z-axis to generate a Z-axis histogram;
  (6) extracts level information from the Z-axis histogram, wherein peaks of the Z-axis histogram identify a location of floors and ceilings of the building interior;
  (7) segments the building interior by level and processing each level separately;
  (8) for each level:
    (i) removes floor and ceiling points from the point cloud data;
    (ii) generates a height histogram of the point cloud data and removing laser scanning points above a maximum value on the height histogram;
    (iii) retains voxels with neighboring voxels that consist of laser scanning points that form a plane parallel to the Z-axis;
    (iv) generates a two-dimensional X-Y histogram of the retained voxels that contain at least one laser scanning point and removing voxels with a total number of laser scanning points below a minimum value;
    (v) extracts wall locations from the two-dimensional X-Y histogram; and
    (vi) generates a reference grid by:
      (A) finding one or more straight walls by examining, for each non-empty voxel, neighboring voxels, and retaining voxels that form a vertical plane;
      (B) projecting remaining voxels onto an 2D XY plane;
      (C) accumulating non-empty voxels in each row of the 2D XY plane to form a Y-histogram along the Y-axis;
      (D) accumulating non-empty voxels in each column of the 2D XY plane to form a X-histogram along the X-axis; and
      (E) generating the reference grid of a floor plan based on peaks from the X-histogram and the Y-histogram.

\* \* \* \* \*